United States Patent
Felkl

(10) Patent No.: US 9,836,067 B2
(45) Date of Patent: Dec. 5, 2017

(54) HYDRAULIC ARRANGEMENT HAVING DECOUPLED OPERATION OF TWO VALVE DEVICES

(71) Applicant: PRIMETALS TECHNOLOGIES GERMANY GMBH, Erlangen (DE)

(72) Inventor: Hans-Joachim Felkl, Forchheim (DE)

(73) Assignee: PRIMETALS TECHNOLOGIES GERMANY GMBH (DE)

( * ) Notice: Subject to any disclaimer, the term of this patent is extended or adjusted under 35 U.S.C. 154(b) by 243 days.

(21) Appl. No.: 14/783,502

(22) PCT Filed: Feb. 26, 2014

(86) PCT No.: PCT/EP2014/053724
§ 371 (c)(1),
(2) Date: Oct. 9, 2015

(87) PCT Pub. No.: WO2014/166668
PCT Pub. Date: Oct. 16, 2014

(65) Prior Publication Data
US 2016/0062367 A1  Mar. 3, 2016

(30) Foreign Application Priority Data
Apr. 11, 2013 (EP) .................................. 13163385

(51) Int. Cl.
*G05D 7/00* (2006.01)
*G05D 11/02* (2006.01)
(Continued)

(52) U.S. Cl.
CPC ............. *G05D 7/0635* (2013.01); *G05B 7/02* (2013.01); *G05B 11/42* (2013.01); *G05B 15/02* (2013.01)

(58) Field of Classification Search
CPC ...... G05D 7/0635; G05B 11/36; G05B 11/42; G05B 7/02; G05B 15/02
See application file for complete search history.

(56) References Cited

U.S. PATENT DOCUMENTS 3,769,800 A * 11/1973 Winter .................... F16H 61/47
60/445
4,236,202 A   11/1980 Giles et al.
(Continued)

FOREIGN PATENT DOCUMENTS

CN      1031270 A      2/1989
CN      101169141 A    4/2008
(Continued)

OTHER PUBLICATIONS

International Search Report dated Jun. 18, 2014 issued in corresponding International patent application No. PCT/EP2014/053724.
(Continued)

*Primary Examiner* — Mark Connolly
(74) *Attorney, Agent, or Firm* — Ostrolenk Faber LLP

(57) ABSTRACT

The invention relates to a hydraulic actuator (1) that can be controlled by a main valve (2) and an auxiliary valve (3). Upstream of the main valve device (2) is a main regulator (7), having a P block (9) and an I block (10). Upstream of the auxiliary valve (3) is an auxiliary regulator (8), having a base block (11) and an I block (12). In a normal mode of operation, the auxiliary valve (3) is deactivated. The main regulator is provided with a main setpoint variable (p*) and a corresponding main actual quantity (p) of the hydraulic actuator (1). The main regulator (7) determines a main actuating variable (s) and predefines the main actuating variable (s) in the main valve device (2). In a special mode of operation, the base block (11) of the auxiliary regulator (8) is provided with an auxiliary setpoint variable (a*) and a corresponding auxiliary actual quantity (p) of the hydraulic
(Continued)

actuator (1). The base block (11) of the auxiliary regulator (8) determines an auxiliary actuating variable (s') and pre-defines the auxiliary actuating variable (s') in the auxiliary valve device (3). The I block (12) of the auxiliary regulator (8) is provided with the main setpoint variable (p*) and the main actual quantity (p). The I block (12) of the auxiliary regulator (8) determines an integral component (si') therefrom. The integral component (si') is applied to the auxiliary actuating variable (s'). In the special mode of operation, the P block (9) is provided with the main setpoint variable (p*) and the main actual quantity (p). In the special mode of operation, the P-block (9) determines the main actuating variable (s) and predefines the main actuating variable (s) in the main valve device (2).

16 Claims, 1 Drawing Sheet

(51) Int. Cl.
*G05B 11/60* (2006.01)
*G05D 7/06* (2006.01)
*G05B 7/02* (2006.01)
*G05B 11/42* (2006.01)
*G05B 15/02* (2006.01)

(56) References Cited

U.S. PATENT DOCUMENTS

| | | | | |
|---|---|---|---|---|
| 4,386,626 A | * | 6/1983 | Hehl | F15B 13/0405 |
| | | | | 137/529 |
| 4,945,723 A | | 8/1990 | Izumi et al. | |
| 5,046,400 A | * | 9/1991 | Karakama | F15B 13/0807 |
| | | | | 137/596.2 |
| 6,067,782 A | * | 5/2000 | Diekhans | A01B 69/007 |
| | | | | 56/10.2 A |
| 2009/0223358 A1 | * | 9/2009 | Green | F15B 19/002 |
| | | | | 91/361 |
| 2010/0042261 A1 | | 2/2010 | Ishikawa et al. | |
| 2011/0024654 A1 | | 2/2011 | Shi | |

FOREIGN PATENT DOCUMENTS

| | | |
|---|---|---|
| DE | 35 00 482 A1 | 7/1986 |
| JP | 2010044591 A | 2/2010 |

OTHER PUBLICATIONS

Written Opinion dated Jun. 18, 2014 issued in corresponding International patent application No. PCT/EP2014/053724.
European Search Report dated Jun. 19, 2013 issued in corresponding European patent application No. 13 16 3385.
Office Action with Search Report dated Feb. 4, 2017 in corresponding Chinese Patent Application No. 201480020479.3 (total 5 pages).

* cited by examiner

HYDRAULIC ARRANGEMENT HAVING DECOUPLED OPERATION OF TWO VALVE DEVICES

CROSS-REFERENCE TO RELATED APPLICATIONS

The present application is a 35 U.S.C. §§371 national phase conversion of PCT/EP2014/053724, filed Feb. 26, 2014, which claims priority of European Application No. 13163385.1, filed Apr. 11, 2013, the contents of which are incorporated by reference herein. The PCT International Application was published in the German language.

The present invention relates to an operating method for a hydraulic arrangement. The hydraulic arrangement comprises a hydraulic actuator that can be controlled by a main valve device and an auxiliary valve device. A main regulator comprising a P block and an I block is arranged upstream of the main valve device. The hydraulic arrangement is operated alternatively in a normal mode or in a special mode. In the normal mode the auxiliary valve device is deactivated. The main regulator is provided with a main setpoint variable and a corresponding main actual quantity of the hydraulic actuator. The main regulator determines a main actuating variable with reference to the main setpoint variable and the main actual quantity for the main valve device and predefines the main actuating variable in the main valve device.

The present invention further relates to a hydraulic arrangement, which comprises a hydraulic actuator that can be controlled by a main valve device and an auxiliary valve device. The hydraulic arrangement comprises a control unit, comprising a main regulator arranged upstream, of the main valve device and comprising a P block and an I block.

The control unit operates the hydraulic arrangement alternatively in a normal mode or in a special mode. The control unit is embodied such that in the normal mode the auxiliary valve device is deactivated. The main regulator is provided with a main setpoint variable and a corresponding main actual quantity of the hydraulic actuator and the main regulator determines a main actuating variable for the main valve device with reference to the main setpoint variable and the main actual quantity and predefines the main actuating variable in the main valve device.

Operating methods of this kind and hydraulic arrangements of this kind are generally known.

With hydraulic arrangements, the hydraulic actuator (for example a hydraulic cylinder unit or a hydraulic motor) is usually adjusted by means of a valve device. The valve device enables the hydraulic actuator to be operated in a regulated manner. In particular, in the case of a hydraulic cylinder unit, usually the position of the piston, the force exerted by the piston or a traversing speed of the piston are regulated.

In the case of a hydraulic motor, the corresponding rotary variables are regulated. Suitable valve devices are servovalves, proportional valves or switching valves.

In many cases, it is sufficient for a single valve device to be available to actuate the hydraulic actuator. However, in many cases it is necessary for (at least) two valve devices to be able to act in parallel on the hydraulic actuator. If at a specific time, only one of the two valve devices is actuated or the two are actuated in the same way, this does not cause any problems. If, on the other hand, at a specific time, the two valve devices are exposed to a respective actuating variable independently of one another, the functions effected thereby must not interfere with each other.

SUMMARY OF THE INVENTION

The object of the present invention consists in creating possibilities to enable such a non-mutually coordinated actuation of the valve devices.

It is proposed according to the invention that upstream of the auxiliary valve device, there is an auxiliary regulator comprising a base block and an I block and that in the special mode the base block of the auxiliary regulator is provided with an auxiliary setpoint variable and a corresponding auxiliary actual quantity of the hydraulic actuator, the base block of the auxiliary regulator determines an auxiliary actuating variable for the auxiliary valve device with reference to the auxiliary setpoint variable and the auxiliary actual quantity and predefines the auxiliary actuating variable in the auxiliary valve device, the I block of the auxiliary regulator is provided with the main setpoint variable and the main actual quantity, the I block of the auxiliary regulator determines an integral component with reference to the main setpoint variable and the main actual quantity, the integral component is applied to the auxiliary actuating variable, the P block of the main regulator is provided with the main setpoint variable and the main actual quantity and the P block of the main regulator determines the main actuating variable with reference to the main setpoint variable and the main actual quantity and predefines the main valve device.

In a preferred embodiment of the operating method, in the normal mode, a check is performed as to whether the main setpoint variable is constant or varies. When the main setpoint variable is constant, the I block of the main regulator is activated. When the main setpoint variable varies, the I block of the main regulator is deactivated. For example, depending on whether it is activated or not, the I block of the main regulator can be provided or not provided with the main setpoint variable and the main actual quantity.

It is possible for a binary switching non-return valve to be arranged upstream or downstream of the auxiliary valve device. In this case, preferably opening of the non-return valve corresponds to a transition from the normal mode into the special mode and closing of the non-return valve corresponds to a transition from the special mode into the normal mode.

In a particularly preferred embodiment of the operating method, the I block of the main regulator is used as the I block of the auxiliary regulator, on the change from the normal mode into the special mode, the most recently determined output signal of the I block of the main regulator is stored temporarily as an initial signal for the normal mode in a buffer memory and an initial signal stored in the buffer memory for the special mode is read out of the buffer memory and loaded into the I block of the main regulator and on the change from the special mode into the normal mode, the most recently determined output signal of the I block of the main regulator is stored temporarily as an initial signal for the special mode in the buffer memory and the initial signal stored in the buffer memory for the normal mode is read out of the buffer memory and loaded into the I block of the main regulator.

In a completely opened status, the main valve device has a main nominal flow. Similarly, in a completely opened status, the auxiliary valve device has an auxiliary nominal flow. The auxiliary nominal flow is preferably significantly greater than the main nominal flow, for example, at least ten times as large.

The main setpoint variable and the corresponding main actual quantity can be determined as required. As a rule, the main setpoint variable and the corresponding main actual quantity are positions or forces.

Similarly, the auxiliary setpoint variable and the corresponding auxiliary actual quantity can be determined as required. For example, the auxiliary setpoint variable and the corresponding auxiliary actual quantity can be accelerations.

As a rule, the hydraulic actuator is embodied as a hydraulic cylinder unit.

Content-wise, the hydraulic arrangement according to the invention and the embodiments thereof correspond to device technology for the implementation of the above-explained operating method and the embodiments thereof. Therefore, in order to avoid repetitions, reference is made to the above-explanations.

The above-described properties, features and advantages of this invention and the manner in which these are achieved will become clearer and more understandable in conjunction with the following description of the exemplary embodiments, which are explained in more detail with reference to the drawings. The drawings show schematically:

DESCRIPTION OF EMBODIMENTS

Figure 1:
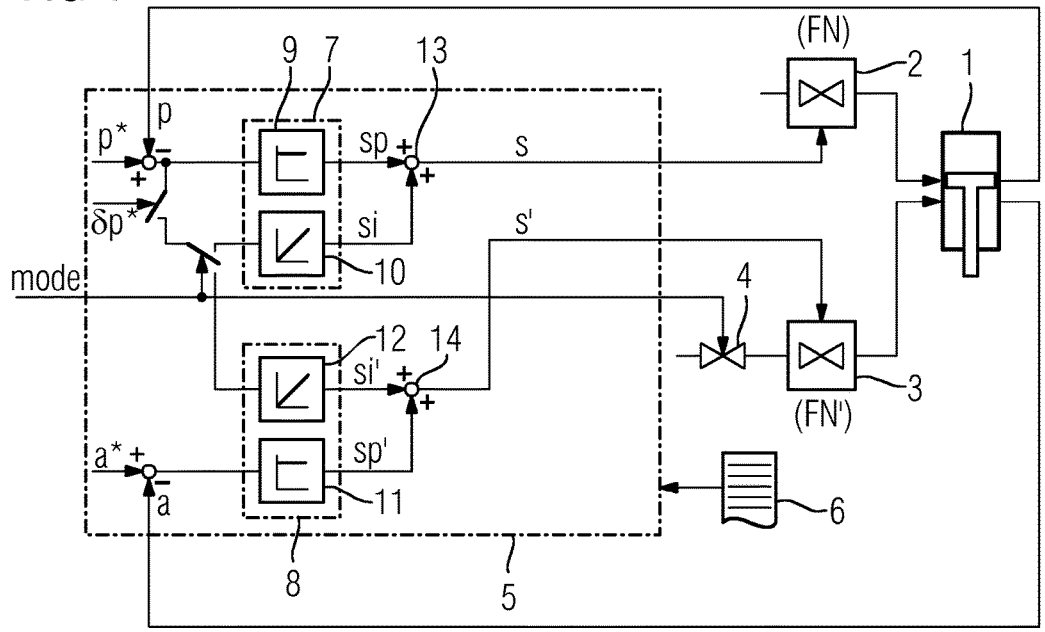
FIGS. 1 and 2 a hydraulic arrangement in each case.

In FIG. 1, a hydraulic arrangement comprises a hydraulic actuator 1. The hydraulic actuator 1 can be embodied as a hydraulic motor. In FIG. 1, the hydraulic actuator 1 is embodied as a hydraulic cylinder unit. The hydraulic actuator 1 can be controlled via two valve devices 2, 3, hereinafter designated main valve device 2 and auxiliary valve device 3. The use of the prefixes "main" and "auxiliary" with 2, 3 with the valve devices and with the other elements and variables given these prefixes is for linguistic differentiation only. The prefixes "main" and "auxiliary" have no further significance.

The main valve device 2 can be embodied as a usual servo-valve or proportional valve. Valves of this kind have regulated adjustment. Alternatively, the main valve device 2 can comprise two or four switching valves that have binary switching only. In this case, the switching valves can, for example, be controlled by means of pulse-width modulation or pulse-code modulation so that, in this case, once again, the main valve device 2 has regulated adjustment.

The auxiliary valve device 3 can also be embodied in the same way as the main valve device 2. Preferably, a non-return valve 4 is arranged upstream or downstream of the auxiliary valve device 3 in respect of a hydraulic system (not shown). The non-return valve 4 is preferably embodied as a switching valve with low-frequency binary switching, i.e. it has either the status completely or the status completely closed.

The hydraulic arrangement further comprises a control unit 5. The control unit 5 is as a rule embodied as a software-programmable control unit, which executes a computer program 6. The control unit 5 implements in each case for the main valve device 2 and the auxiliary valve device 3 a regulator 7, 8, which is arranged upstream of the respective valve device 2, 3 in terms of control technology. Hereinafter, the two regulators 7, 8 are designated the main regulator 7 and the auxiliary regulator 8.

The main regulator 7 is embodied as a PI regulator (a higher-order regulator). The main regulator 7 comprises at least one P block 9 and one I block 10. The P block 9 has purely proportional behavior; the I block 10 purely integral behavior. The I block 10 is used to detect a leakage of hydraulic fluid that is unavoidable in practice and to set the working point of the main valve device 2 such that the leakage is compensated in stable state. To this end, the I block 10 has a reset time. The reset time is as a rule relatively long so that the main regulator 7 follows a change to the working point relatively slowly. The auxiliary regulator 8 comprises a base block 11 and an I block 12. The base block 11 can implement basically any controller characteristics. In the simplest case, the base block 11 has purely proportional behavior so that the base block 11 is a P block. The I block 12 has—similarly to the I block 10 of the main regulator 7—purely integral behavior.

The control unit 5 operates the hydraulic arrangement alternatively in a normal mode or in a special mode. The following will first describe the normal mode and then the special mode.

In the normal mode, exclusively the main regulator 7 and the main valve device 2 are active. On the other hand, the auxiliary valve device 3 and the auxiliary regulator 8 are deactivated. In the normal mode, the auxiliary valve device 3 does not act on the hydraulic actuator 1. In the normal mode, the main regulator 7 is provided with a main setpoint variable p* and a corresponding main actual quantity p of the hydraulic actuator 1. The main regulator 7 determines a main actuating variable s for the main valve device 2 with reference to the main setpoint variable p* and the main actual quantity p. In particular, the P block 9 of the main regulator 7 determines a proportional component sp and the I block 10 of the main regulator 9 determines an integral component si. The proportional component sp and the integral component si are added to the main actuating variable s in a nodal point 13. The main regulator 7 predefines the main actuating variable s in the main valve device 2.

The main setpoint variable p* and the main actual quantity p can, for example, be positions or forces. For example, the main regulator 7 and the main valve device 2 can be used to load a loop lifter on a metal strip inside a rolling mill or to operate a rolling stand of the rolling mill with force or thickness regulation.

Figure 2:
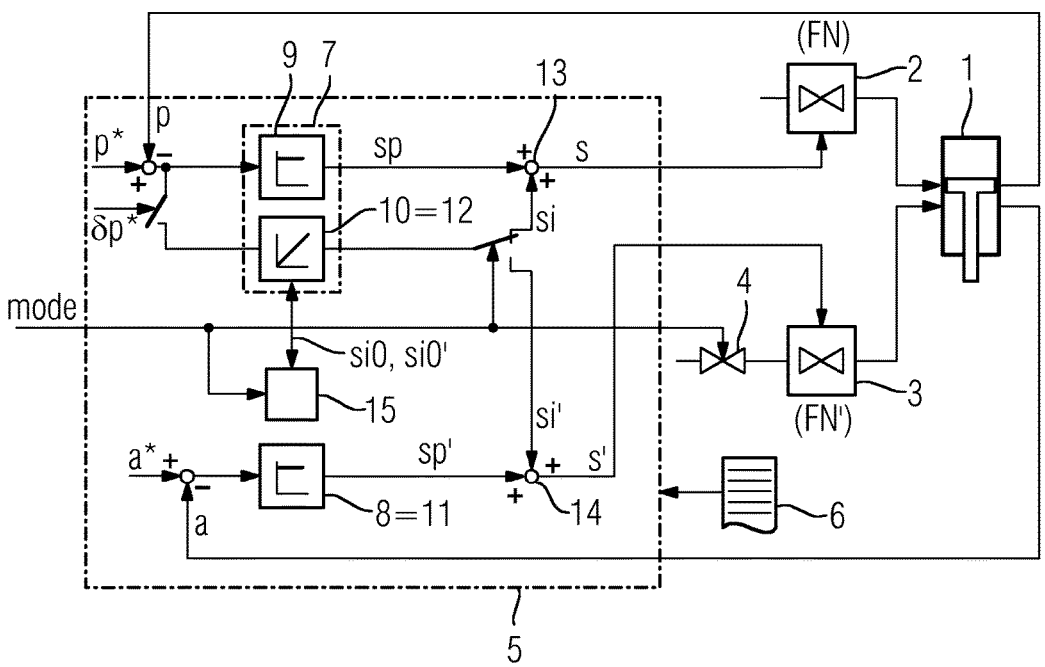

In the special mode see FIG. 2 the auxiliary regulator 8 and the auxiliary valve device 3 are activated. The P block 9 of the main regulator 7 and also the main valve device 2 are not deactivated, but are operated differently than in the normal mode. On the other hand, the I block 10 of the main regulator 7 is deactivated.

In the special mode, the base block 11 of the auxiliary regulator 8 is provided with an auxiliary setpoint variable a* and a corresponding auxiliary actual quantity a of the hydraulic actuator 1. The base block 11 of the auxiliary regulator 8 determines an auxiliary actuating variable s' for the auxiliary valve device 3 with reference to the auxiliary setpoint variable a* and the auxiliary actual quantity a predefines the auxiliary actuating variable s' in the auxiliary valve device 3. Hence, in particular when the base block 11 has proportional behavior, the base block 11 determines a proportional component sp'.

On the other hand, the I block 12 of the auxiliary regulator 8 is provided, not with the auxiliary setpoint variable a* and the auxiliary actual quantity a, but with the main setpoint variable p* and the main actual quantity p. The I block 12 of the auxiliary regulator 8 uses these variables p*, p to determine an integral component si'. The proportional component sp' (or more generally the basic component sp') and the integral component si' are added to the auxiliary actuating variable s' in a nodal point 14. Hence, the integral component si' is applied to the auxiliary actuating variable s' determined by the base block 11 of the auxiliary regulator 8.

The auxiliary setpoint variable a* and the auxiliary actual quantity a can, for example, be accelerations. In the special mode, the auxiliary valve device 3 and the base block 11 of the auxiliary regulator 8 can, for example, be used to damp or compensate unwanted vibrations that occur during the operation of the device adjusted by means of the hydraulic actuator 1 (for example a rolling stand). In particular for damping and suppressing unwanted vibrations (mill chatter), the auxiliary actual quantity a oscillates with a relatively high frequency of, as a rule, approximately 100 Hz to approximately 150 Hz.

In the special mode, the main setpoint variable p* and the main actual quantity p are not provided to the whole main regulator 7, but only to the P block 9 of the main regulator 7. The P block 9 of the main regulator 7 determines—similarly to in the normal mode—the proportional component sp. Therefore, the mode of operation of the P block 9 as such is unchanged compared to the normal mode. However, in the special mode, the main actuating variable s corresponds directly to the proportional component sp. Hence, the P block 9 predefines the main actuating variable s in the main valve device 2.

In a particularly preferred embodiment of the present invention, in the normal mode, a check is performed as to whether the main setpoint variable p* is constant or varies. When the main setpoint variable p* is constant (alteration value $\delta p^*=0$), the I block 10 of the main regulator 7 is activated. On the other hand, when the main setpoint variable p* varies (alteration value $\delta p^*=1$), the I block 10 of the main regulator 7 is deactivated. For example, to this end, depending on whether the I block 10 is activated or not, the I block 10 of the main regulator 7 can be provided or not provided with the main setpoint variable p* and the main actual quantity p. The intermittent deactivation of the I block 10 of the main regulator 7 means that the working point of the main valve device 2 is only tracked when a constant operating state is to be assumed. Therefore, dynamic adjustment processes have no influence on the working point.

The circumstances used to decide whether the normal mode or the special mode is present can be determined as required. Preferably, the operating modes (normal mode and special mode) and the state of the non-return valve 4 are coupled to one another. In particular, opening of the non-return valve 4 preferably corresponds to a transition from the normal mode into the special mode and closing of the non-return valve 4 corresponds to a transition from the special mode into the normal mode. This can for example be achieved in that the change to the operating mode directly causes the corresponding actuation of the non-return valve 4 or vice versa the actuation of the non-return valve 4 causes the establishment of the corresponding operating mode.

In a completely opened status, the main valve device 2 has a main nominal flow FN. Similarly, in a completely opened status, the auxiliary valve device 3 has an auxiliary nominal flow FN'. The above-explained procedure according to the invention is in particular of advantage when the auxiliary nominal flow FN' is significantly greater than the main nominal flow FN, in particular at least ten times greater. For example, the auxiliary nominal flow FN' can be a thirty-times, fifty-times or, in some circumstances, even greater multiple of the main nominal flow FN.

The hydraulic arrangement in FIG. 2 substantially corresponds to that in FIG. 1. However, unlike in FIG. 1, in FIG. 2 the I block 10 of the main regulator 7 is used in the special mode as the I block 12 of the auxiliary regulator 8. Therefore, in special mode, the I block 10 of the main regulator 7 determines the integral component si'. The I block 10 of the main regulator 7 predefines the integral components si' in the auxiliary valve device 3. Therefore, the technical effect of the I block 10—namely the establishment of the working point—is retained. However, in the special mode, the I block 10 does not act on the main valve device 2, but on the auxiliary valve device 3. Distortions on the actuation of the auxiliary valve device 3, which did result in any corresponding compensation with which, averaged over time, an oil flow different from zero flows into or out of the hydraulic actuator 1, are hence compensated by the I block 10 of the main regulator 7. However, the compensation does not affect the main valve device 2, but the auxiliary valve device 3.

As a rule, the leakage behavior of the main valve device 2 and the leakage behavior of the auxiliary valve device 3 differ from each other. Therefore, the working points set by means of the I block 10 in the normal mode and in the special mode are generally not the same. Therefore, in order to ensure a smooth transition from the normal mode into the special mode and vice versa, with the embodiment in FIG. 2, the control unit 5 is preferably embodied such that, on a change of operating mode, it stores the previous working point and initializes the I block 10 of the main regulator 7 accordingly. This is explained below initially for the transition from the normal mode into the special mode and then vice versa for the transition from the special mode into the normal mode.

Hence, let us assume that there is to be a transition from the normal mode into the special mode. At the time of the change of the operating mode, the I block 10 has a specific output signal, i.e. the most recently determined integral component si. On the change from the normal mode into the special mode, this value is stored temporarily as an initial signal si0 for the normal mode in a buffer memory 15. An initial signal si0' for the special mode is then read out of the buffer memory 15 and loaded into the I block 10 of the main regulator 7.

If, vice versa, there is to be a transition from the special mode into the normal mode, the inverse procedure is used: in this case, once again, at the time of the change of the operating mode, the I block 10 of the main regulator 7 has a specific output signal, i.e. the most recently determined integral component si'. On the change from the special mode into the normal mode, this value is stored temporarily as an initial signal si0' for the special mode in the buffer memory 15. The initial signal si0 for the normal mode is then read out of the buffer memory 15 and loaded into the I block 10 of the main regulator 7.

Hence, as a result, on a change of operating mode, the integral component si, si' of the respective abandoned operating mode is frozen and the integral component si0, si0' of the respective newly adopted operating mode is reactivated.

The present invention has numerous advantages. It is in particular possible to achieve leakage compensation in an easy way in both operating modes without changing the working point of the main valve device 2.

Although the invention was illustrated and described in more detail by means of the preferred exemplary embodiment, the invention is not restricted by the disclosed examples and other variations can be derived herefrom by the person skilled in the art without departing from the protective scope of the invention.

The invention claimed is:

1. An operating method for a hydraulic arrangement,
the hydraulic arrangement comprising a hydraulic actuator, a main valve device to control the hydraulic actuator and an auxiliary valve device;
a main regulator arranged upstream of the main valve device and comprising a P block and an I block;
an auxiliary regulator arranged upstream of the auxiliary valve device and comprising a base block and an I block;
the hydraulic arrangement is operated alternatively in a normal mode or in a special mode;
wherein in the normal mode
the auxiliary valve device is deactivated,
the main regulator is provided with a main setpoint variable (p*) and a corresponding main actual quantity (p) of the hydraulic actuator and
the main regulator determines a main actuating variable for the main valve device with reference to the main setpoint variable (p*) and the main actual quantity (p) and to predefine the main actuating variable in the main valve device;
wherein in the special mode
the base block of the auxiliary regulator is provided with an auxiliary setpoint variable (a*) and a corresponding auxiliary actual quantity (a) of the hydraulic actuator,
the base block of the auxiliary regulator determines an auxiliary actuating variable (s') for the auxiliary valve device with reference to the auxiliary setpoint variable (a*) and the auxiliary actual quantity (a) and predefines the auxiliary actuating variable (s') in the auxiliary valve device;
the I block of the auxiliary regulator is provided with the main setpoint variable (p*) and the main actual quantity (p),
the I block of the auxiliary regulator determines an integral component (si') with reference to the main setpoint variable (p*) and the main actual quantity (p),
the integral component (si') is applied to the auxiliary actuating variable (s'),
the P block of the main regulator is provided with the main setpoint variable (p*) and the main actual quantity (p) and
the P block of the main regulator determines the main actuating variable (s) with reference to the main setpoint variable (p*) and the main actual quantity (p) and predefines in the main valve device.

2. The operating method as claimed in claim 1, wherein in the normal mode, a check is performed as to whether the main setpoint variable (p*) is constant or varies, and when the main setpoint variable (p*) is constant, the I block of the main regulator is activated, and when the main setpoint variable (p*) varies, the I block of the main regulator is deactivated.

3. The operating method as claimed in claim 1, wherein a binary switching non-return valve is arranged upstream or downstream of the auxiliary valve device, and opening of the non-return valve corresponds to a transition from the normal mode into the special mode, and closing of the non-return valve corresponds to a transition from the special mode into the normal mode.

4. The operating method as claimed in claim 1, wherein:
in the special mode, using the I block of the main regulator as the I block of the auxiliary regulator;
on the change from the normal mode into the special mode;
storing the most recently determined output signal (si) of the I block of the main regulator temporarily as an initial signal (si0) for the normal mode in a buffer memory; and
an initial signal stored in the buffer memory (si0') for the special mode is read out of the buffer memory and loaded into the I block of the main regulator and
on the change from the special mode into the normal mode;
storing the most recently determined output signal (si) of the I block of the main regulator temporarily as an initial signal (si0') for the special mode in the buffer memory and
reading the initial signal (si0) stored in the buffer memory for the normal mode out of the buffer memory and loaded loading the initial signal into the I block of the main regulator.

5. The operating method as claimed in claim 1, further comprising in a completely opened status, the main valve device has a main nominal flow (FN), such that, in a completely opened status, the auxiliary valve device has an auxiliary nominal flow (FN') that is significantly greater than the main nominal flow (FN).

6. The operating method as claimed in claim 1, wherein the main setpoint variable (p*) and the corresponding main actual quantity (p) are positions or forces.

7. The operating method as claimed in claim 1, wherein the auxiliary setpoint variable (a*) and the corresponding auxiliary actual quantity (a) are accelerations.

8. The operating method as claimed in claim 1, wherein the hydraulic actuator is embodied as a hydraulic cylinder unit.

9. A hydraulic arrangement, comprising:
a hydraulic actuator configured to be controlled by a main valve device and an auxiliary valve device;
a control unit configured to implement a main regulator comprising a P block and an I block arranged upstream of the main valve device; and
the control unit is configured to implement an auxiliary regulator comprising a base block and an I block arranged upstream of the auxiliary valve device; and
the control unit operates the hydraulic arrangement alternatively in a normal mode or in a special mode;
the control unit is configured such that in the normal mode;
the auxiliary valve device is deactivated;
the main regulator is provided with a main setpoint variable (p*) and a corresponding main actual quantity (p) of the hydraulic actuator; and
the main regulator determines a main actuating variable (s) for the main valve device with reference to the main setpoint variable (p*) and the main actual quantity (p) and predefines the main actuating variable (s) in the main valve device;
wherein the control unit is furthermore configured such that in the special mode
the base block of the auxiliary regulator is provided with an auxiliary setpoint variable (a*) and a corresponding auxiliary actual quantity (a) of the hydraulic actuator;
the base block of the auxiliary regulator determines an auxiliary actuating variable (s') for the auxiliary valve device with reference to the auxiliary setpoint variable (a*) and the auxiliary actual quantity (a) and predefines the auxiliary actuating variable (s') in the auxiliary valve device;
the I block of the auxiliary regulator is provided with the main setpoint variable (p*) and the main actual quantity (p) the I block of the auxiliary regulator determines an integral component (si') with reference to the main setpoint variable (p*) and the main actual quantity (p);
the integral component (si') is applied to the auxiliary actuating variable (s'); and
the P block of the main regulator is provided with the main setpoint variable (p*) and the main actual quantity (p) and the P block of the main regulator determines the main actuating variable (s) with reference to the main setpoint variable (p*) and the main actual quantity (p) and predefines in the main valve device.

10. The hydraulic arrangement as claimed in claim 9, further comprising the control unit is configured such that, in the normal mode, a check is performed as to whether the main setpoint variable (p*) is constant or varies and in the event of the main setpoint variable (p*) being constant, the I block of the main regulator is activated and, in the event of the main setpoint variable (p*) varying, the I block of the main regulator is deactivated.

11. The hydraulic arrangement as claimed in claim 9, further comprising a binary switching non-return valve is arranged upstream or downstream of the auxiliary valve device and the control unit is configured such that opening of the non-return valve corresponds to a transition from the normal mode into the special mode and a closing of the non-return valve corresponds to a transition from the special mode into the normal mode.

12. The hydraulic arrangement as claimed in claim 9, further comprising:
the control unit is configured such that, in the special mode, the I block of the main regulator is used as the I block of the auxiliary regulator;
on the change from the normal mode into the special mode the most recently determined output signal (si) of the I block of the main regulator is stored temporarily as an initial signal (si0) for the normal mode in a buffer memory; and
an initial signal (si0') stored in the buffer memory for the special mode is read out of the buffer memory and loaded into the I block of the main regulator; and
on the change from the special mode into the normal mode, the most recently determined output signal (si) of the I block of the main regulator is stored temporarily as an initial signal (si0') for the special mode in the buffer memory; and
the initial signal (si0) stored in the buffer memory for the normal mode is read out of the buffer memory and loaded into the I block of the main regulator.

13. The hydraulic arrangement as claimed in claim 9, further comprising, in a completely opened status, the main valve device has a main nominal flow (FN), that, in a completely opened status, the auxiliary valve device has an auxiliary nominal flow (FN') and that the auxiliary nominal flow (FN') is significantly greater than the main nominal flow (FN).

14. The hydraulic arrangement as claimed in claim 9, further comprising the main setpoint variable (p*) and the corresponding main actual quantity (p) are positions or forces.

15. The hydraulic arrangement as claimed in claim 9, further comprising the auxiliary setpoint variable (a*) and the corresponding auxiliary actual quantity (a) are accelerations.

16. The hydraulic arrangement as claimed in claim 9, further comprising the hydraulic actuator is embodied as a hydraulic cylinder unit.

* * * * *